Oct. 5, 1948.  J. FRYE  2,450,546
MILLING MACHINE CONTROL GEAR
Filed Aug. 13, 1945  4 Sheets-Sheet 1
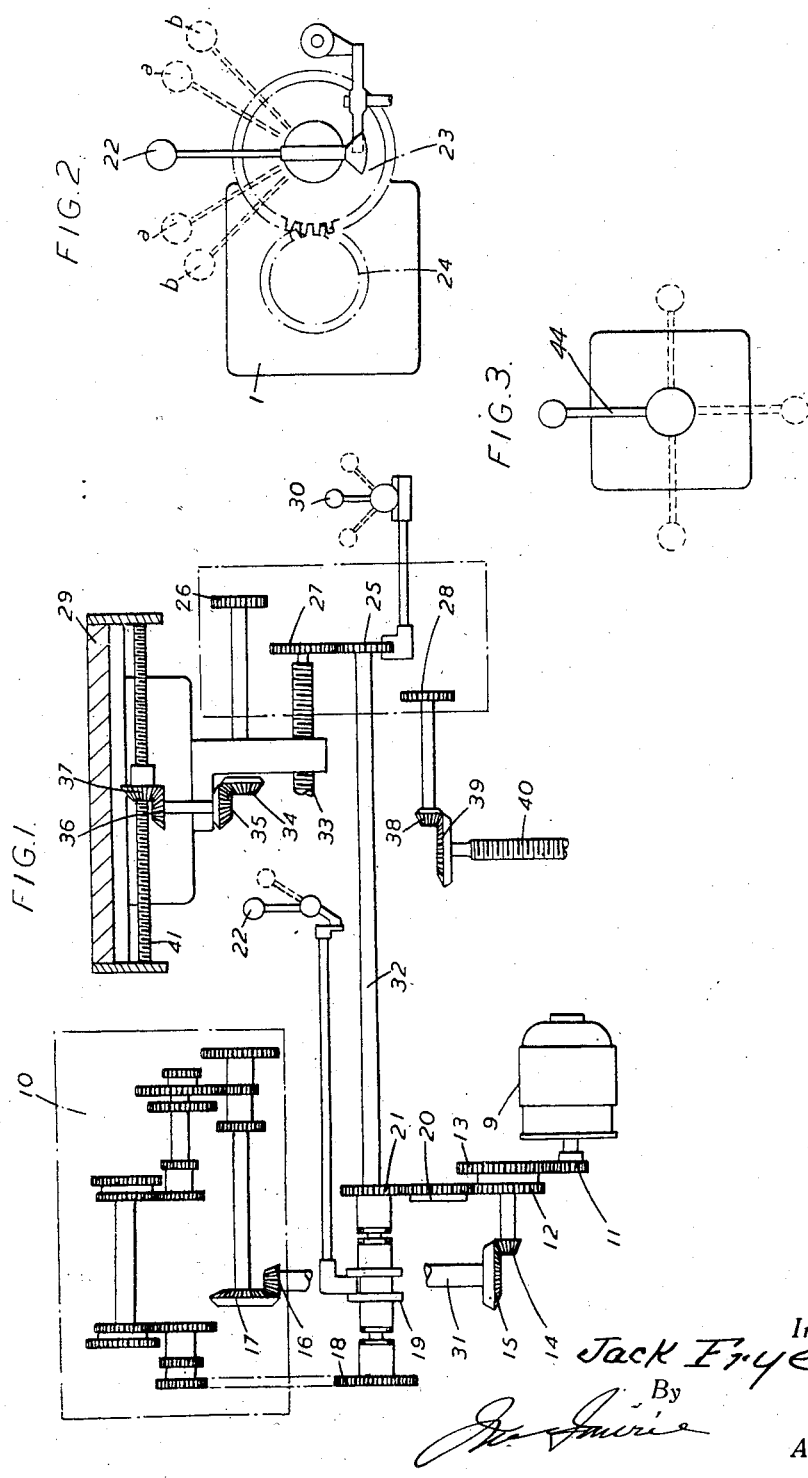
Inventor
Jack Frye
By
Attorney

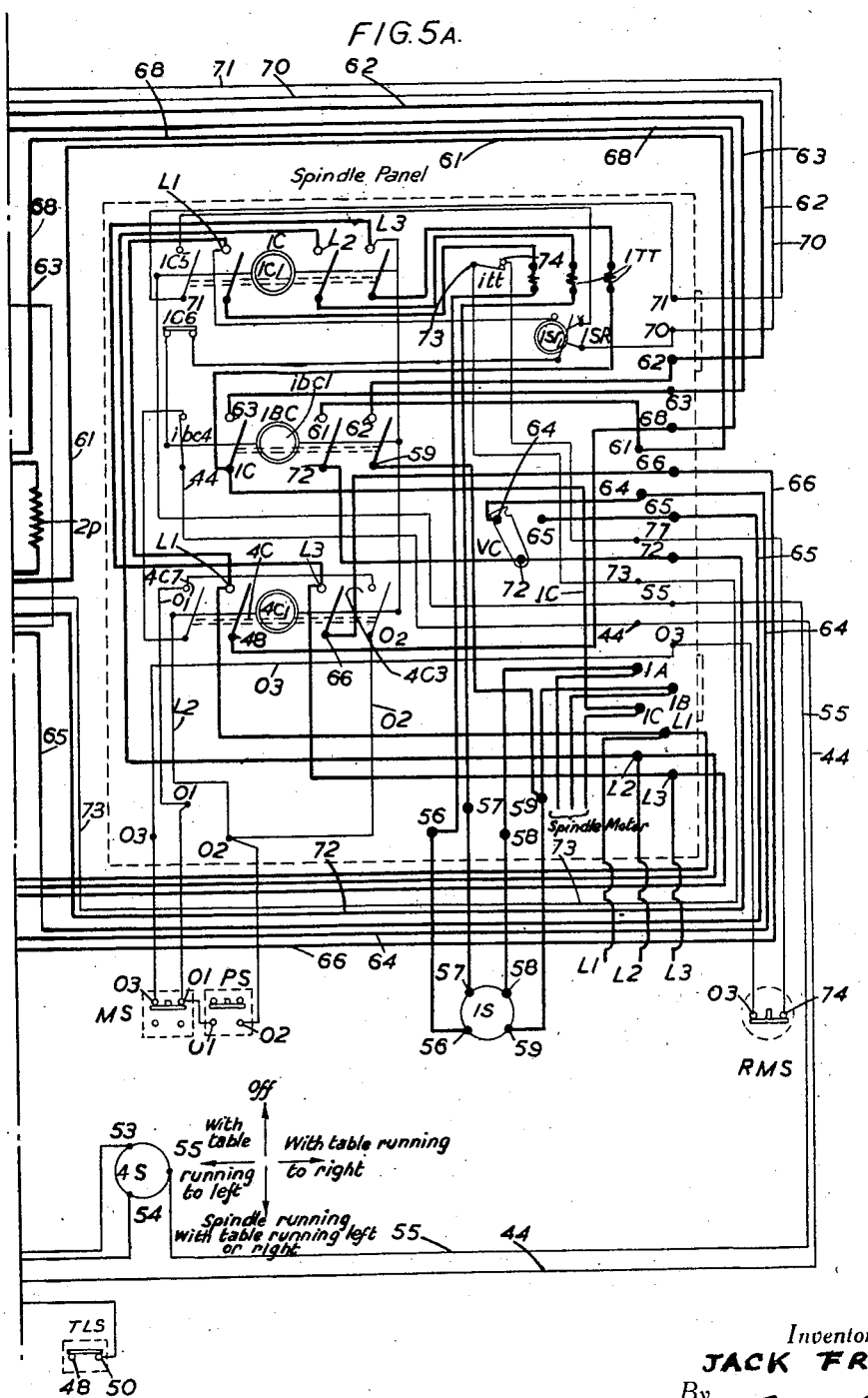

Patented Oct. 5, 1948

2,450,546

UNITED STATES PATENT OFFICE 2,450,546

MILLING MACHINE CONTROL GEAR

Jack Frye, Broomfield, Abbotts Langley, England

Application August 13, 1945, Serial No. 610,575
In Great Britain December 3, 1943

Section 1, Public Law 690, August 8, 1946
Patent expires December 3, 1963

13 Claims. (Cl. 90—21)

1

The present invention relates to milling machines, and refers more particularly to milling machines of the "knee" type, in which a "knee" projects forwardly from the standard beneath the milling spindle, and carries a work table which can be horizontally traversed in either of two directions at right angles, namely parallel to, and at right angles to the milling spindle. The work table can also be raised and lowered by vertically traversing the knee either upwardly or downwardly on the standard.

The object of the invention is to provide improved means for controlling the operation of the machine, viz. the rotation of the milling spindle and the traversing of the work table and knee, the controlling means being in part mechanical and in part electrical, whereby the operation and control of the machine is facilitated and simplified.

The machine is operated by two electric motors, one for driving the milling spindle in either direction, and another of smaller power adapted to be selectively operated to drive the vertical knee traversing gear, or either of the two horizontal table traversing gears, in either direction i. e. backwards and forwards, or transversely left or right. The control gear also permits various combinations of these traversing movements with the spindle movement to be obtained simultaneously. Furthermore the traversing gears are adapted to be selectively operated at either slow or high speed, the former speed being generally utilised for cutting operations and the latter for return movements of the work table, when no cutting operation is in progress.

The mechanical gear for operating the milling spindle may comprise simply a speed reducing gear box interposed between the larger driving motor, which is of reversible type, and the milling spindle, the drive from motor to gear box being through a belt and pulleys.

The mechanical gear for traversing the knee vertically and the work table horizontally backwards and forwards or transversely on the knee comprises a reduction gear train driven by a small reversible electric motor which drives a shaft carrying a sliding pinion which can be brought by a selection lever into mesh with any one of three pinions, one pinion driving a screw adapted to traverse the work table backwards and forwards on the knee, another pinion driving a screw adapted to traverse the work table on the knee transversely to the milling spindle, and the third pinion driving a screw adapted to traverse the knee carrying the table vertically.

2

The said shaft is driven at a fast or slow speed through a two way clutch, the moving member of which is operated by a clutch control lever to clutch the shaft direct to the final element of the reduction gear train driven by the motor, to give a high speed of traverse, or to a speed reduction gear box driven by an intermediate member of the reduction gear train, to give a low speed of traverse.

In accordance with the foregoing, therefore, the improved milling machine driving and control gear according to the invention comprises an electric motor for driving the milling spindle in either direction through speed reduction gearing, a second motor adapted to drive a shaft adapted to be selectively coupled to means for varying the height of the work table, its position in a horizontal direction parallel to the milling spindle, or its position in a horizontal direction at right angles to the milling spindle, and means for varying the speed at which said shaft is driven by said second motor operating at a given speed. Thus in one arrangement said shaft is adapted to be coupled directly through a gear train to the second motor, or indirectly through a speed reduction gear box to the same gear train.

An important part of the invention resides in the electrical control gear for the two motors, which are not separately controlled but jointly controlled in functional co-operation. Further in certain respects the electrical control gear is functionally combined with the mechanical control gear.

Thus according to a further feature of the invention the driving and control gear comprises an electric motor for driving the milling spindle in either direction, a second motor for traversing the knee carrying the work table up or down or traversing the table on the knee, either left or right, or backwards or forwards, switch means for selectively controlling the direction of traverse, and means associated with said switch means for selectively controlling the speed of traverse to give a slow or a quick traverse at will. Furthermore said switch means may also control the spindle motor in such manner as to set it running before the traverse motor is set running, in moving from a neutral stop position into traversing position.

According to another feature of the invention the electrical control gear includes a spindle selector switch, whereby the spindle may be caused to run in either direction of traverse, but not in the reverse direction, or to run in both directions of traverse.

The invention also includes certain features in relation to the braking of the spindle and traversing motors, which is effected electrically by current injected into the windings of the traversing and spindle motors. Thus according to this part of the invention the control gear includes means which are automatically rendered operative on the switching off of the traversing or spindle motor to apply a braking action to the motor concerned.

The machine may be operated electrically by direct current, or by alternating current, in which case three-phase A. C. is preferred. In the case, however, of alternating current operation of the two driving motors, braking of these motors is effected by the injection of direct current into their windings, the direct current being obtained from the alternating current supply through a rectifier. Means may be provided for varying the braking current to control the braking effort.

In order that the invention may be clearly understood and readily carried into practice, it is illustrated, by way of example only, in the accompanying drawings, in which—

Figure 1 is a diagrammatic representation of the mechanical arrangements of a milling machine according to the invention, Figure 2 is a diagram illstrating the functions of the spindle and feed control starting switch, Figure 3 is a diagram illustrating the functions of the spindle selector switch.

Figures 5 and 5A are enlarged diagrams corresponding to the diagram of Figure 4.

Figure 4:
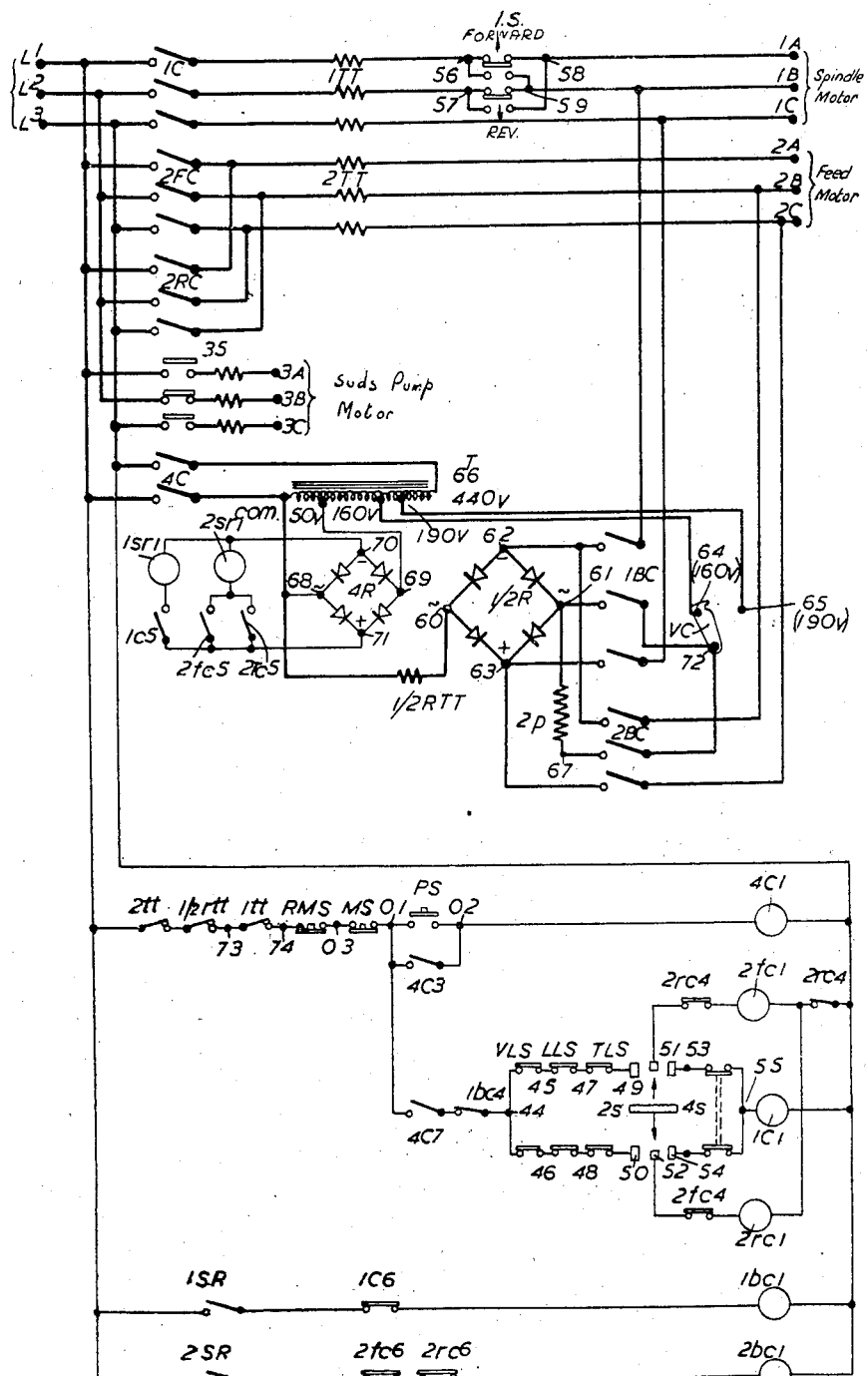
Figure 4 is a circuit diagram of the electrical control arrangements.
Figure 5:
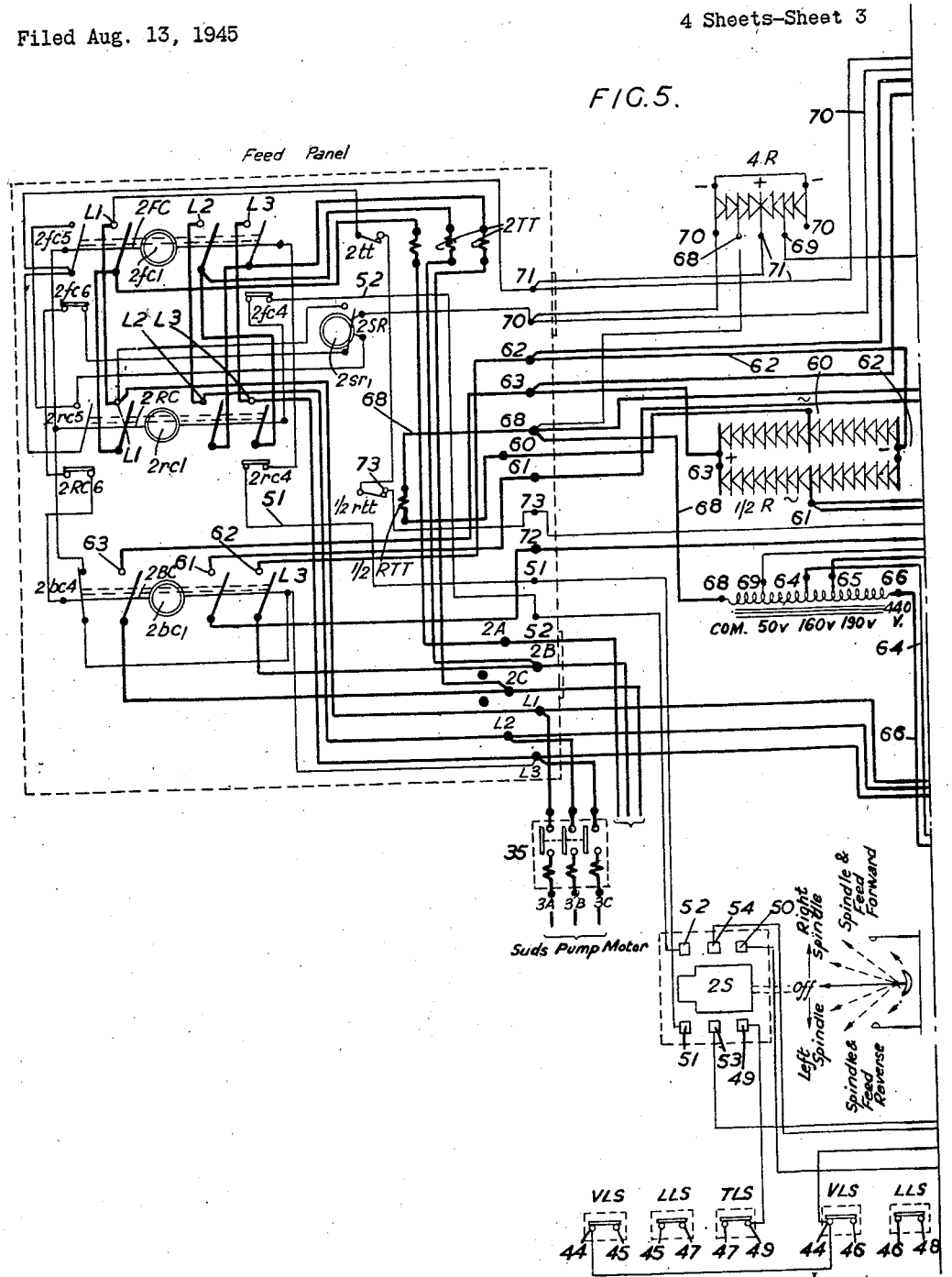

As previously indicated the machine is operated by two motors, one of which is adapted to drive the milling spindle in either direction at a constant speed through suitable reduction gearing, in well-known manner not necessitating illustration. The other motor is of smaller power and is used for selectively traversing the work table in any of six directions, viz. horizontally in either direction on the knee, vertically in either direction with the knee, and backwards and forwards on the knee.

The invention is mainly concerned with the electrical control gear of the machine and its association with the mechanical operating gear of the machine, but the mechanical arrangements will first be briefly described.

The spindle is driven through normal reduction gearing by a reversible electric motor controlled by normal electrical switch gear. In Figure 1, therefore, only the mechanical arrangements for the traversing motor are diagrammatically shown.

Referring now to Figure 1, 9 indicates the traversing motor, which drives through reduction gearing 11, 13 and bevel gearing 14, 15, a shaft 31, which drives through bevel gearing 16, 17, the input side of a reduction gear box 10, the output side of which drives, through chain or other gearing, a gear 18 integral with one free end of sliding clutch 19. The sliding element of clutch 19 may be engaged, either with the free end integral with gear 18 or with another free end, integral with gear 21 which is geared, through idle gear 20, to gear 12 of the train driven by motor 9. The sliding element of clutch 19 is keyed to a driving shaft 32 so that according to the adjustment of the clutch 19 the shaft 32 is driven by motor 9 either through gear train 11, 13, 12, 20, 21 at a high speed, or through gear train 11, 13, bevel gearing 14, 15, shaft 31, bevel gearing 16, 17, gear box 10, and gear 18, at a reduced speed.

The operation of the machine is so controlled that during a working stroke the table is traversed by shaft 32 operating at a slow speed, whilst during return movements it may be traversed by shaft 32 operating at a higher speed.

In Figure 1 the gear 25 on shaft 32 is shown meshed with gear 27 driving traversing screw 33, giving forward and backward movement of the work table 29 on the knee of the machine. If gear 25 is meshed with gear 28 it drives through bevel gearing 38, 39, a traversing screw 40 giving vertical movement to the knee carrying the table 29, whilst if it is meshed with gear 26, a traversing screw 41 drives the work table 29 to left or right in the horizontal direction, through bevel gearing 34, 35, 36, 37.

The adjustment of gear 25 into mesh with any of the three gears 26, 27 or 28 to select the direction of traverse is effected, as diagrammatically indicated, by lever 30, which accordingly has three setting positions.

The setting of clutch 19 into high or low speed position is effected by a lever 22 which has a rotary movement which operates, through gearing 23, 24, a main switch 1 controlling the spindle motor and the traverse or feed motor 9 as hereinafter described, and a rocking movement which operates clutch 19. The various setting positions of lever 22 are indicated in Figure 2. In positions $a$ the spindle motor is started running in a direction determined by switch 1S (Figure 4), in positions $b$ the traversing motor is operated to traverse in one direction or the other, either up or down, left or right, or forwards or backwards, according to the setting of the traverse selector lever 30, whilst in either end position $b$ the lever 22 can be rocked forwardly to operate clutch 19 to give a quick return traverse.

The electrical control equipment for the machine in the case of a three-phase supply system is illustrated by Figures 3, 4, 5 and 5A, all the switches being shown in the positions they occupy when the machine is shut down.

The operation of the milling machine is controlled by a series of switches whose functions will first be briefly indicated. Switch 1S is provided to control the direction of running of the milling spindle and is adapted simply to reverse the connections to the lines, of two of the three-phase windings of the spindle motor. Switch 2S is a simple make and break switch of conventional construction provided as the main control switch 1 of Figure 2 for starting and stopping the spindle motor and traversing motor 9, and also for selecting the direction of running of the traverse motor and its speed of running, as will hereinafter appear. Switch 4S is the spindle selector switch, which is provided to determine in which direction of traverse the spindle runs, whether it runs in both directions of traverse, or whether it remains stationary during both directions of traverse. Switch 3S is merely a starter switch for a pump driving motor for feeding a cooling and lubricating fluid to the milling tool and work.

In addition there is a normally closed "master stop" switch MS of push button type, which can be operated at any time to stop the whole machine working, for closing down. This is located in a convenient position for the operator working the machine, and is duplicated by one or more "remote master stop" switches RMS located at some other convenient position or positions at which the master switch MS is not accessible to the operator. There is also a "prepare start" switch PS which is open when the machine is closed down and is manually closed prior to starting, for the purpose of energising the operating coil 4CI of contactor 4C to operate switch 4c7 which makes the circuits of the operating coils Ic1, 2fc1 and 2rc1 of the three main contactors IC, 2FC and 2RC ready for completion by main control switch 2S. After manual operation of switch PS the contactor 4C is held closed by a maintaining circuit through 4c3, until the circuit of contactor operating coil 4c1 is broken by operation of the master stop switch MS or the remote master stop RMS. The three switches MS, RMS and PS are in series with operating coil 4CI across the lines L1, L3.

The power supply lines L1, L2, L3 are adapted to be connected by triple pole contactor IC operated by coil ICI, through thermal overload trip coils ITT and a reversing switch IS to the spindle motor, which is connected at IA, IB, IC. The switch IS in one position supplies current from line L1 to phase winding IA, along path 56, 58, and to phase winding IB from line L2 along path 57, 59, whilst in the reverse position of the switch the connections of these two windings are reversed, so that winding IA is fed through path 57, 58 and winding IB is fed through path 56, 59.

The lines L1, L2, L3 also feed two triple pole contactors 2FC, 2RC operated respectively by coils 2fc1 and 2rc1, for producing forward and reverse running respectively of the traversing or feed motor 9, the triple pole starter switch 3S supplying at terminals 3A, 3B, 3C a small auxiliary motor for operating a pump supplying "suds" to the milling tool and work, and a double pole contactor 4C for energising a tapped auto-transformer T which supplies the braking current as hereinafter explained.

The circuits between contactors 2FC and 2RC and the traverse motor 9 include thermal overload trip coils 2TT, and the circuit between transformer T and braking rectifier 1/2R includes a thermal overload trip coil 1/2RTT. The three thermal overload switches operated by these trip coils, namely 1tt for spindle motor, 2tt for the traverse motor 9, and 1/2rtt for the rectifier are in series with the master stop switch MS, through which the main control switch 2S is supplied.

When "prepare start" switch PS is closed the circuit of braking contactor operating coil 4c1 is closed through path O2, O1, MS, O3, RMS, 74, 1tt, 73, 1/2rtt and 2tt, and switches 4c3 and 4c7 become closed. Closure of switch 4c3 completes a maintaining circuit for operating coil 4c1. Closure of switch 4c7 makes the circuits of operating coil ICI of spindle motor contactor, of operating coil 2fc1 of forward contactor 2FC, and of operating coil 2rc1 of reverse contactor 2RC of the traverse motor 9, through interlocking switch 1bc4 of spindle motor brake contactor IBC, limit switches VLS, LLS, TLS and interlocking switches 2fc4 of forward traverse contactor 2FC and 2rc4 of reverse traverse contactor 2RC, ready for completion by switch 2S according to its direction of movement, either to bridge contacts 50, 52, 54 or contacts 49, 51, 53.

As already explained the switch 2S has a central off-position flanked by two positions (a, a Figure 2) in which the spindle runs, but the traverse motor is stationary. In one of these positions the switch 2S bridges contacts 49, 53 and in the other position bridges contacts 50—54, and since the contacts 49, 53 and 50, 54 are in parallel circuits in series with contactor coil ICI, the spindle runs in both cases, in a direction determined by switch IS. If the switch lever 22 (Fig. 2) is moved further over in either direction into position b, b, the traverse motor is also brought into action to feed either forward or back, as the result of switch 2S bridging either contact 51 in addition to 49—53 or contact 52 in addition to 50, 54. In positions b, b the traverse produced by motor 9 will take place either slowly or fast according as switch lever 22 remains upright or is pulled forwardly as previously explained; the slow speed is used during cutting traverse or feeds and the high speed for return traverses.

However, before switch 2S moves fully over to bridge contacts 49, 51 or contacts 50, 52, as the case may be, it bridges contacts 49, 53, or 50, 54, thereby completing the circuit of the operating coil ICI of spindle motor contactor IC, through selector switch 4S, the setting of which to make a path through 53, 55 or 54, 55 determines the direction of running of the spindle motor.

Switch 2S is the rotary switch 1 driven by gearing 23, 24 from the spindle of lever 22 in Figs. 1 and 2. In positions b of lever 22, switch 2S is set to complete the circuit of either the operating coil 2fc1 of forward contactor 2FC or the operating coil 2rc1 of reverse contactor 2RC of the traverse motor. At the same time the circuit of operating coil Ic1 of spindle motor contactor IC is also completed. In positions a, however, of lever 22, the circuit of operating coil ICI of spindle motor contactor IC only is completed.

As will be seen, there are two series of limit switches VLS, LLS and TLS located in position to be tripped by the work table at opposite ends of its travel, VLS indicating the vertical limit switches, LLS the longitudinal limit switches, and TLS the traverse limit switches. These sets of switches are in series with the operating coil 2fc1 or 2rc1 of the contactor 2FC or 2RC which is operative in producing the direction of traverse at the end of which the limit switch becomes operative.

The spindle selector switch 4S a simple make and break switch of conventional construction is a rotary switch operated by lever 44 having the four positions indicated in Figure 3. In the vertical upright or "off" position the paths 53—55 and 54—55 of Figure 4 are both broken and the spindle motor remains stationary; in the vertical downward position both of said paths are completed and the spindle runs during both directions of traverse; in the right hand side position the spindle runs when the table traverses right, due to completion of path 53, 55, whilst in the left hand side position path 54—55 is completed and the spindle runs when the table traverses left.

Also connected across the lines L1, L2 in parallel with the above switch gear is a circuit through the operating coil 1bc1 of the brake contactor IBC for the spindle motor. This circuit is interlocked with the spindle motor contactor IC by the normally closed switch IC6 which energises operating coil 1bc1, when the spindle contactor IC opens. It is also controlled by the normally open switch ISR, which is closed by a slugged relay 1sr1 immediately upon the completion of the circuit of the coil 1sr1, by closure of switch IC5 on operation of the spindle motor contactor IC, and opens after a predetermined time delay following opening of contactor IC.

Thus the closure of spindle contactor IC completes the circuit of slugged relay coil 1sr1 at switch 1c5, and causes closure of switch 1SR. However, when contact 1C is opened the switch 1SR does not immediately open, but only opens after a predetermined time delay. During this time delay the contactor 1BC is operated by coil 1bc1 and injection of D. C. into the spindle motor takes place, to produce braking as hereinafter described.

Similarly there is another parallel circuit through the operating coil 2bc1 of the braking contactor 2BC for the traversing motor, which is completed by closure of switch 2SR by slugged relay 2sr1, immediately upon the closure of switch 2fc5 or 2rc5, by the forward contactor 2FC or the reverse contactor 2RC, which completes the circuit of slugged relay 2sr1. This circuit is interlocked with the traverse motor forward and reverse contactors 2FC and 2RC respectively by the normally closed switches 2fc3 and 2rc6 respectively, which de-energize the traverse motor brake contactor operating coil 2bc1, when either of them is opened by operation of the forward or reverse running contactor as the case may be.

The slugged relay 2sr1 opens the switch 2SR only after a predetermined time interval following deenergisation of relay coil 2sr1 at contacts 2fc5, 2fc6 opened by opening the main contactor 2FC or 2RC, and it is during this time interval that contactor 2BC is operated by coil 2bc1 to cause injection of D. C. into the traversing motor and braking occurs as hereinafter explained.

The spindle and traverse motors are both braked by injecting direct current into their windings under the control of suitable switch gear. The direct current is obtained from a selenium rectifier 1/2R which is supplied at points 60, 61 by a tapped auto-transformer T fed from mains L2, L3 through contactor 4C, thermal overload trip coil 1/2 R. T. T., and through the middle pole of either the spindle motor braking contactor 1BC, or the traverse motor braking contactor 2BC, and terminal 72 of voltage changing switch VC, whose contactors 64 and 65 are connected to tappings at different voltages on transformer T. In the case of the traverse motor a resistance 2p is provided in the circuit to reduce the braking current. Points 62, 63 of the rectifier supply the spindle and traverse motors respectively through two of the poles of the respective contactors 1BC and 2BC. The switch VC permits of a degree of adjustment of the braking current.

A further supply of direct current is obtained from tapping points on transformer T for application to the slugged timing relay operating coils 1sr1 and 2sr1. A low voltage, say 50 volts is fed from the transformer T to input terminals 68, 69 of selenium rectifier 4R, and the output terminals 70 and 71 of the rectifier are connected to the relays 1sr1 and 2sr1 in parallel, the connections from terminal 71 passing through switch 1C5 of forward spindle contactor 1C in the case of relay 1sr1, and either through switch 2fc5 of traverse motor forward contactor 2FC, or switch 2rc5 of traverse motor reverse contactor 2RC in the case of relay 2sr1.

Energisation of relay coil 1sr1 causes closure of relay switch 1SR after a predetermined time interval following closure of brake contactor 4C, to energise spindle brake contactor coil 1bc1, and similarly energisation of relay coil 2sr1 will after a predetermined time interval energise the operating coil 2bc1 of traverse motor braking contactor 2BC, through switch 2SR.

It will be seen that the circuit of spindle motor braking contactor 1bc1 becomes energised when the spindle motor contactor 1C is opened, in which position switch 1C6 is closed, as the result of closure of switch 1SR, after a suitable time interval, by slugged relay 1sr1 whose circuit is completed by switch 1C5, closed when contactor 1C opens. Similarly the circuit of traverse motor braking contactor 2bc1 becomes energised when the spindle motor forward contactor 2FC, or the reverse contactor 2RC is opened, in which cases switches 2fc6 and 2rc6 are both closed as the result of closure of switch 2SR, after a suitable time interval, by slugged relay 2sr1, whose circuit is completed by contactor 2fc5 or 2rc5 when contactor 2FC or 2RC, as the case may be, opens.

Obviously many modifications may be made in the arrangements and circuits herein described and illustrated without departing from the scope of the invention as hereinafter defined.

I claim:

1. Milling machine driving and control gear comprising a driving motor for the milling spindle, a reversing switch for selectively controlling the direction of running of said motor, a second electric motor for adjusting the work table of the machine, a shaft adapted to be driven by said motor at high or low speed according to the setting of a control member, means for selectively coupling said shaft to driving means for raising and lowering the work table, or traversing the work table laterally, or moving the work table to and fro parallel to the milling spindle, and a common control switch for both of said motors having a neutral position in which both motors are at rest, two extreme lateral positions in which the spindle motor and the second motor run in opposite directions to traverse the table in opposite directions, and two other lateral positions intermediate between the neutral position and the extreme lateral positions in which the second motor does not run but the spindle motor runs, so that traverse of the work is stopped before the milling cutter ceases to rotate.

2. Milling machine driving and control gear comprising a driving motor for the milling spindle, a reversing switch for selectively controlling the direction of running of said motor, a second electric motor for adjusting the work table, a shaft adapted to be driven by said motor at high or low speed according to the setting of a control member, means for selectively coupling said shaft to driving means for raising and lowering the work table, or traversing the work table laterally, or moving the work table to and fro parallel to the milling spindle, and a common control switch for both of said motors, whose operating member has a neutral position in which both motors are at rest, two extreme lateral positions in which the spindle motor runs and the second motor runs in opposite directions to traverse the table in opposite directions, said operating member constituting the aforesaid control member and being movable in said extreme positions to give fast or slow drive of the table traversing gear by the second motor, and said operating member has two other lateral positions intermediate between the neutral position and the extreme lateral positions in which the second motor does not run but the spindle motor runs, so that traverse of the work is stopped before the milling cutter ceases to rotate.

3. Milling machine driving and control gear comprising a driving motor for the milling spindle, a reversing switch for selectively controlling the direction of running of said motor, a second electric motor for adjusting the work table, a shaft adapted to be driven by said motor at high or low speed according to the setting of a control member, means for selectively coupling said shaft to driving means for raising and lowering the work table, or traversing the work table laterally, or moving the work table to and fro parallel to the milling spindle, and a spindle selector switch whose operating member has four setting positions in one of which the spindle motor is stopped, in another of which the spindle motor is caused to operate in the direction of traverse only, in the third of which the spindle motor is caused to operate in the other direction of traverse only, and in the fourth of which the spindle motor is caused to operate in either direction of traverse, said spindle selector switch operating in conjunction and in series with a control switch the setting of which determines the direction of running of the second motor according to the desired direction of traverse.

4. Milling machine driving and control gear according to claim 1, including a spindle selector switch, whereby the spindle may be caused to run in either direction of traverse but not in the reverse direction, or to run in both directions of traverse.

5. Milling machine driving and control gear according to claim 1, including means which are automatically rendered operative on the switching off of the traversing or spindle motor to apply a braking action to the motor concerned for a predetermined time interval.

6. Milling machine driving and control gear according to claim 2, wherein the braking is effected electrically by current injected into the windings of the traversing and spindle motors.

7. Milling machine driving and control gear according to claim 2, wherein the traversing and spindle motors are operated by alternating current, but for braking purposes direct current is injected into their windings.

8. Milling machine driving and control gear according to claim 3, including means for varying the strength of the braking current applied to the traversing and spindle motors.

9. Milling machine driving and control gear according to claim 1, comprising a main switch adapted to control the running of the spindle motor and also to control the direction of running of the traverse motor, a switch controlling the direction of running of the spindle motor, and a selector switch the setting of which causes the spindle motor to run in either of the two directions of traverse and to remain stationary in the other direction of traverse, or prevents the spindle motor from running, or causes the spindle motor to run in both directions of traverse.

10. Milling machine driving and control gear according to claim 2, wherein a lever operating the main switch is also operable in either of its two positions producing running of the traverse motor in one direction or the other, to control clutch shifting means whereby the traverse motor is driven at either one of two different speeds.

11. Milling machine driving and control gear according to claim 3, including limit switches adapted to be tripped by a predetermined movement of the work table, to interrupt the circuit controlled by the main operating control switch controlling the operation of the traversing motor.

12. Milling machine driving and control gear according to claim 2, including a normally closed "master stop" switch, and one or more "remote master stop" switches, in series with an operating coil which sets switches to prepare the circuits of forward and reverse contacts for the feed motor, for completion by the main operating control switch.

13. Milling machine driving and control gear according to claim 3, including a "prepare start" switch in series with the master stop and remote master stop switches, which is open when the machine is shut down and is manually closed to enable the motor contactors to be operated by the main operating control switch.

JACK FRYE.

REFERENCES CITED

The following references are of record in the file of this patent:

UNITED STATES PATENTS

| Number | Name | Date |
| --- | --- | --- |
| 1,796,332 | Johnson | Mar. 17, 1931 |
| 2,082,140 | Bennett et al. | June 1, 1937 |
| 2,363,934 | Bennett | Nov. 28, 1944 |